L. E. CLARE.
APPARATUS FOR MANUFACTURING GLASS.
APPLICATION FILED JULY 9, 1915.

1,197,184.

Patented Sept. 5, 1916.

Inventor
Luman E. Clare
By his Attorneys
Kerr, Page, Cooper & Hayward

UNITED STATES PATENT OFFICE.

LUMAN E. CLARE, OF WEST ELIZABETH, PENNSYLVANIA, ASSIGNOR TO MISSISSIPPI GLASS COMPANY, OF NEW YORK, N. Y., A CORPORATION OF NEW YORK.

APPARATUS FOR MANUFACTURING GLASS.

1,197,184.    Specification of Letters Patent.    Patented Sept. 5, 1916.

Application filed July 9, 1915.  Serial No. 38,872.

*To all whom it may concern:*

Be it known that I, LUMAN E. CLARE, a citizen of the United States, residing at West Elizabeth, in the county of Allegheny and State of Pennsylvania, have invented certain new and useful Improvements in Apparatus for Manufacturing Glass, of which the following is a full, clear, and exact description.

In manufacturing glass by the use of a table and a roll, it has always been found necessary, after the rolling process is completed, or substantially so, to insert a "sword" between the sheet of glass and the table on which it has been rolled, and by sweeping the sword lengthwise to effect a separation between the lower face of the glass and the table bed, since these two surfaces tend to adhere to one another; this, in order to effect the removal of the glass sheet from the table and transport it to the leer. This practice, which has been always adhered to, is open to objections, based in part upon an incomplete sweep of the sword which renders the removal of the glass sheet difficult, in part to the tax upon the workman who manipulates the sword due to the weight of the glass and its heat, and to other circumstances which are matters of common knowledge in the glass making art.

My improvement is directed to securing uniformity of operation of the sword, to impose the labor of the task upon the power that operates the table and not upon the workman, and to effecting the separation progressively as the sheet is being formed instead of, as heretofore, effecting it at or near the close of the rolling operation.

In carrying out my invention I prefer to use apparatus in which the table bed is caused to be moved forward and backward beneath relatively stationary but revoluble rolls; although it may be applied, with proper modification of apparatus, to the equally well known form of glass rolling table, in which the table bed is held stationary and the rolls are caused to travel forward and back.

Likewise my invention is applicable both to apparatus in which a single roll is used, as in making ordinary rough and ribbed sheet glass, and to apparatus in which two or more rolls are employed, as for example in making wire glass.

Figure 1:
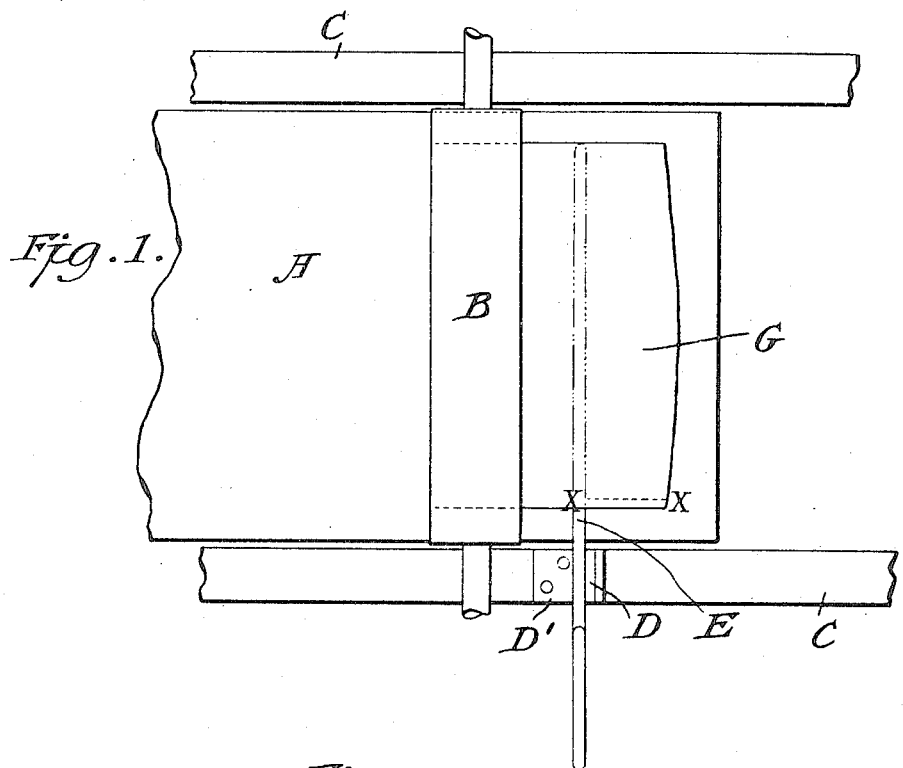
Figure 2:
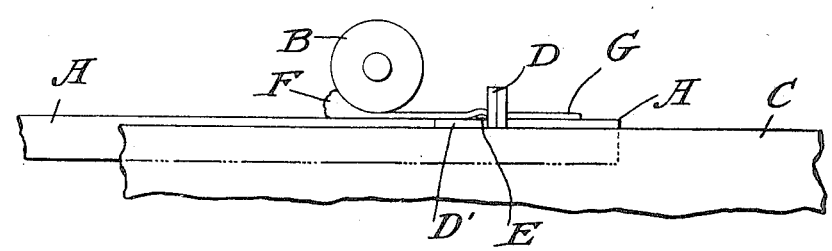
Figure 3:
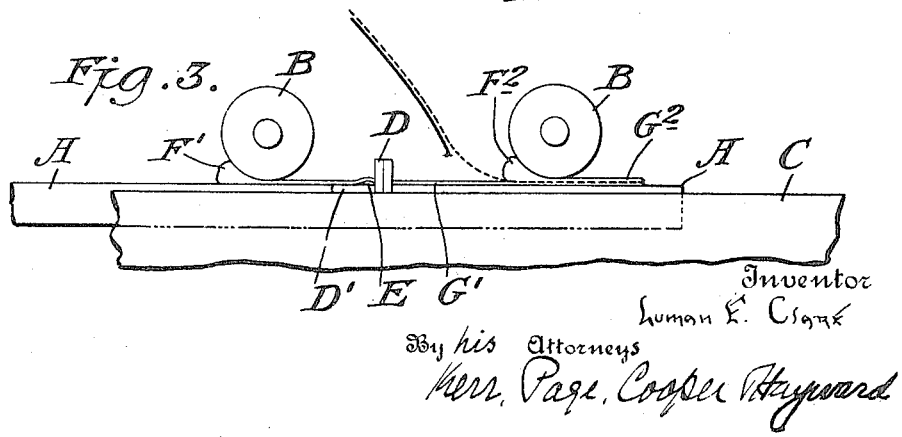

In the accompanying drawings, Figure 1 is a top plan view of a portion of a single-roll table, to which my invention has been applied. Fig. 2 is a side elevation thereof, and Fig. 3 is a side elevation of a double roll table such as is used in the manufacture of wire glass with my invention applied.

In the drawings, A represents a table bed which, in the apparatus chosen by me for illustration, is caused to move forward and back beneath one or more forming rolls B, B. Such tables are provided with stationary members at either side, sometimes designated "stanchions" C, upon which are mounted the revoluble rolls B. In the drawings I have not shown the means by which the table is caused to reciprocate and the forming rolls to revolve, since these are matters of common knowledge in the glass art and not essential to my invention. On one of the stanchions, and at a point in the rear of the single forming roll of Figs. 1 and 2, or the forward one of the two forming rolls in Fig. 3, I mount a device D, which may be termed a guide or stop. Preferably this comprises, in addition to the stop proper D which is in vertical position, a horizontal portion D', the upper surface of which is level with the bed of the table A. The sword or separator is designated E, and it is substantially the same as the sword long used in this manufacture, consisting of a handle and a blade, with the latter elliptical in shape in cross section, ordinarily about one and a half inches wide and three-sixteenths of an inch thick and sufficiently long to extend under the entire width of the sheet of glass.

F represents the single pour of glass made on a one roll table, and G the sheet as it is flattened out by passing under the roll B. With reference to a two roll table adapted for wire glass, as shown in Fig. 3, there may be two pours of glass, F', F², one in front of each of the two rolls. Consequently, a half layer G' is rolled by the forward roll and a second layer G² laid upon it by the rear roll, with the wire introduced as indicated at the pass of the rear roll.

In applying my invention in the form of apparatus shown in Figs. 1 and 2, a pour of glass is made to the left of the roll B and the table is started in its travel to the right, the roll B being made to revolve as the table is moved. The ball of glass F is thereby rolled into a flat sheet G, which travels to the right upon the table bed. When the advancing edge of this sheet comes opposite the stop D, an attendant pushes the sword past the guide or stop D until its point is inserted a distance of an inch or two between the glas sheet and the table bed, and the table carries the glass sheet over the point of the sword, which travels along the edge of the sheet in the manner indicated in the dotted line X—X of Fig. 1, until 15 or 18 inches of the sheet have passed by D, then the sword is thrust straight across the table beneath the entire width of the sheet of glass to the position shown in dotted lines in Fig. 1, and allowed to remain there until the entire sheet of glass has been rolled out and passed above it. By this means, as will be readily understood, the entire sheet, except the "dead end," is separated from the table progressively during the act of formation, and the sword is maintained in its position as by the stop D, against which it is pressed by the friction of the glass passing over the blade of the sword.

In the construction shown in Fig. 3, the parts are the same, except that I prefer to station the stop D and the sword E in the rear of the forward roll—that is, between the two rolls B, B.

I have found that the point at which the sword is applied is of some importance, and after experiment have attained the best results by locating the stop, and hence inserting the sword, at a point about 21 inches in the rear of the single roll B of Figs. 1 and 2, and at the same point in the rear of the forward roll B of Fig. 3. In the latter case, however, I have found it best not to thrust the sword entirely across the sheet until the advancing edge of the lower layer of glass G' has reached the pass of the rear roll B, that is, until the second pour has been made upon the first one. In the construction of wire glass tables with which I have used this invention, the forming rolls B, B have been about 56½ inches apart from center to center, and I have located the stop D 21 inches in the rear of the forward roll.

What I claim as my invention is:

1. In glass rolling apparatus, the combination of a table, a forming roll having lateral movement relative to the table, a stop in fixed position relative to the forming roll and located at the side of the table, and a sword adapted to be thrust between the forming layer of glass and the table bed and to abut against the stop.

2. In glass rolling apparatus, the combination of a roll and a table bed having longitudinal movement relative to each other, a sword guide having a fixed position relative to the roll and located at the side of the table bed and separate therefrom, said guide comprising a vertical stop extending substantially above the plane of the table bed, and a horizontal member at substantially the level of the table bed.

3. In glass rolling apparatus, the combination of a movable table bed, a forming roll revolubly mounted in stationary stanchions at the sides of the table bed, a guide located upon one of the said stanchions and comprising a vertical stop extending substantially above the plane of the table bed, and a horizontal member at substantially the level of the table bed, and a sword adapted to lie upon said horizontal member and against the stop and to extend widthwise of the table bed.

In testimony whereof I affix my signature in the presence of two subscribing witnesses.

LUMAN E. CLARE.

Witnesses:
HARRY L. MCGUIRE,
J. C. METZGAR.

Copies of this patent may be obtained for five cents each, by addressing the "Commissioner of Patents, Washington, D. C."